United States Patent
Mizuno et al.

(10) Patent No.: US 10,025,350 B2
(45) Date of Patent: Jul. 17, 2018

(54) INFORMATION PROCESSING SYSTEM, INFORMATION DEVICE, AND WEARABLE INFORMATION DEVICE

(71) Applicant: CASIO COMPUTER CO., LTD., Tokyo (JP)

(72) Inventors: Kimiyasu Mizuno, Akishima (JP); Tsuyoshi Minami, Musashimurayama (JP); Hideo Suzuki, Ome (JP); Takashi Suenaga, Tokyo (JP); Keiichi Nomura, Uenohara (JP); Shuhei Uchida, Hamura (JP); Munetaka Seo, Fussa (JP); Itsuki Yamashita, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 137 days.

(21) Appl. No.: 14/669,316

(22) Filed: Mar. 26, 2015

(65) Prior Publication Data
US 2015/0281569 A1 Oct. 1, 2015

(30) Foreign Application Priority Data

Apr. 1, 2014 (JP) .................................. 2014-075419
Oct. 15, 2014 (JP) .................................. 2014-210340

(51) Int. Cl.
  *H04N 5/225* (2006.01)
  *G06F 1/16* (2006.01)
  *G06K 9/00* (2006.01)

(52) U.S. Cl.
  CPC ......... *G06F 1/163* (2013.01); *G06K 9/00664* (2013.01); *G06K 2209/03* (2013.01)

(58) Field of Classification Search
  CPC . G06F 1/163; G06K 9/00664; G06K 2209/03
  See application file for complete search history.

(56) References Cited

U.S. PATENT DOCUMENTS

2006/0117017 A1   6/2006  Kawaguchi et al.
2009/0081950 A1*  3/2009  Matsubara ............. H04H 60/80
                                                 455/3.06
(Continued)

FOREIGN PATENT DOCUMENTS

CN   1319980 A   10/2001
CN   1732703 A    2/2006
(Continued)

OTHER PUBLICATIONS

Notification of Reasons for Refusal dated Apr. 11, 2017 received in Japanese Patent Application No. JP 2016-105790 together with an English language translation.

(Continued)

*Primary Examiner* — Twyler Haskins
*Assistant Examiner* — Carramah J Quiett
(74) *Attorney, Agent, or Firm* — Scully, Scott, Murphy & Presser, P.C.

(57) ABSTRACT

A wearable information device is configured to store device identifying information used for identifying the information device registered in advance, to confirm whether or not a taken image, in which an object in a direction of line of vision of a user is taken, shows the information, by image analysis based on the stored device identifying information, and to notify the information device of a result of the confirmation. The information device is configured to execute a predetermined function on the basis of the result of the confirmation of the information device notified from the wearable information device.

20 Claims, 8 Drawing Sheets

(56) References Cited

U.S. PATENT DOCUMENTS

2014/0187233 A1* 7/2014 Chen .................. H04M 1/0277
455/422.1
2015/0381885 A1* 12/2015 Kim .................. H04N 5/23219
348/207.1

FOREIGN PATENT DOCUMENTS

| CN | 202795232 U | 3/2013 |
| EP | 1 098 271 A1 | 9/2001 |
| JP | H10-228515 A | 8/1998 |
| JP | 2002-152327 A | 5/2002 |
| JP | 2002-197421 A | 7/2002 |
| JP | 2007-195028 A | 8/2007 |
| JP | 2008-186297 A | 8/2008 |
| JP | 2009-048488 A | 3/2009 |
| JP | 6119538 B2 | 4/2017 |

OTHER PUBLICATIONS

First Office Action dated May 2, 2017 received in Chinese Patent Application No. CN 201410484528.0 together with an English language translation.

Notification of Reasons for Refusal dated Jul. 18, 2017 received in Japanese Patent Application No. JP 2016-105790 together with an English language translation.

First Office Action dated Jul. 24, 2017 received in Chinese Patent Application No. CN 201510133686.6 together with an English language translation.

* cited by examiner

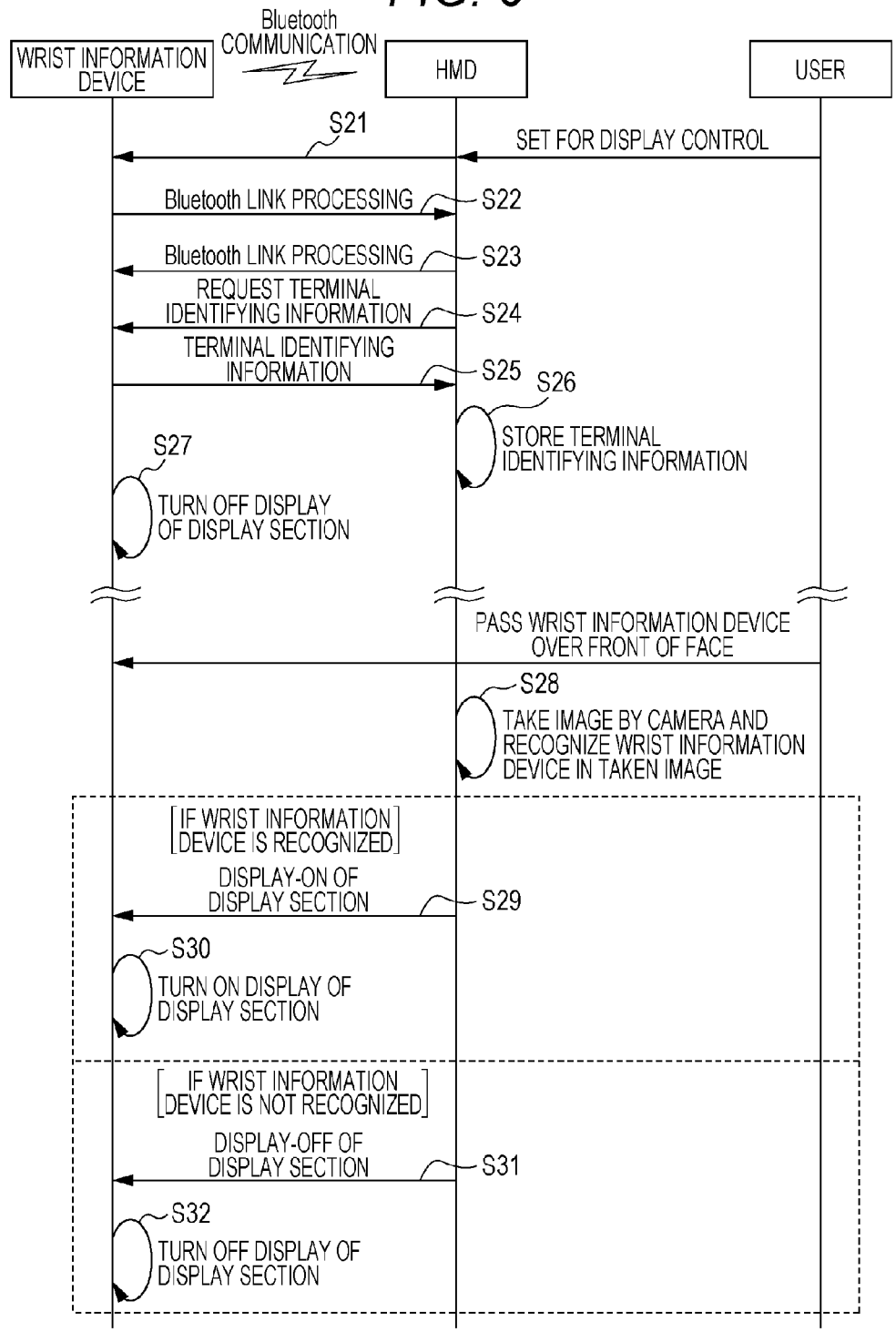

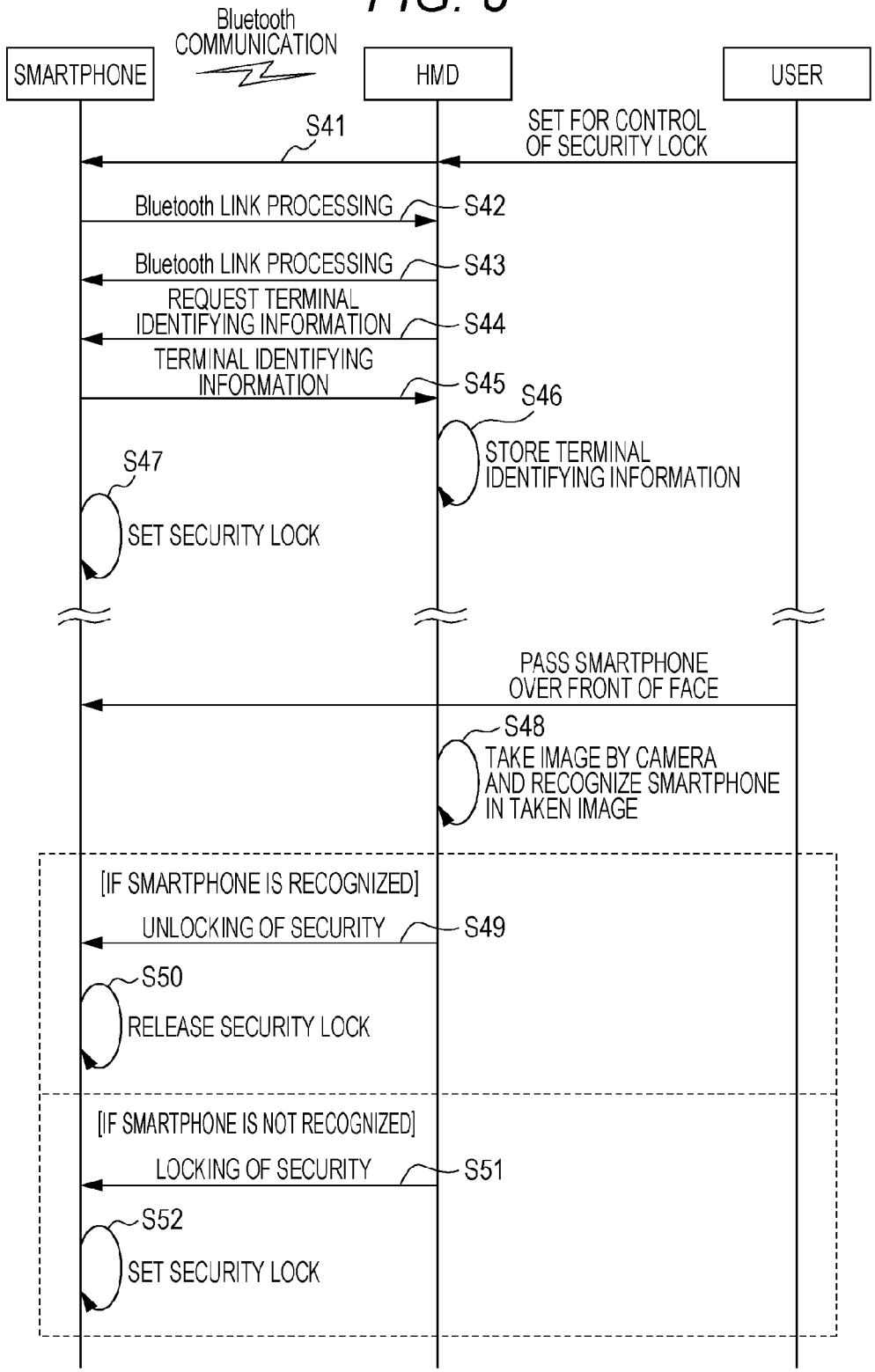

INFORMATION PROCESSING SYSTEM, INFORMATION DEVICE, AND WEARABLE INFORMATION DEVICE

CROSS-REFERENCE TO RELATED APPLICATIONS

This application is based upon and claims the benefit of priority from Japanese Patent Application No. 2014-075419, filed on Apr. 1, 2014; and Japanese Patent Application No. 2014-210340, filed on Oct. 15, 2014, the entire contents of all of which are incorporated herein by reference.

FIELD OF THE INVENTION

The present invention relates to, a technique of controlling an information device suitable in use for an information device in the shape of a watch, a smartphone and the like.

BACKGROUND OF THE INVENTION

Recent years, attention is being focused on a smartphone and an information device in the shape of a watch (hereinafter referred to as a wrist information device) which operates in cooperation with a smartphone. Such information device may perform high-level information processing by itself, or in cooperation with each other (for example, see JP 2002-152327 A).

According to an embodiment of the present invention, an information processing system includes:
an information device configured to execute a predetermined function; and
a wearable information device configured to communicate with the information device, wherein
the wearable information device includes
a memory unit configured to store device identifying information used for identifying the information device registered in advance,
an image taking unit configured to take an image of an object in a direction of line of vision of a user,
a confirmation unit configured to confirm the presence or absence of the information device in the image taken by the image taking unit, by image analysis based on the device identifying information stored in the memory unit, and
a notification unit configured to notify the information device of a result of the confirmation of the information device by the confirmation unit, and
the information device includes
a function executing unit configured to execute the predetermined function on the basis of the result of the confirmation of the information device notified from the notification unit of the wearable information device.

According to an embodiment of the present invention, an information processing system includes:
an information device configured to execute a predetermined function; and
a wearable information device configured to communicate with the information device, wherein
the wearable information device includes
a memory unit configured to store device identifying information used for identifying the information device registered in advance,
an image taking unit configured to take an image of an object in a direction of line of vision of a user,
a confirmation unit configured to confirm the presence or absence of the information device in the image taken by the image taking unit, by image analysis based on the device identifying information stored in the memory unit, and
a control unit configured to control execution of the function of the information device on the basis of a result of the confirmation by the confirmation unit, and
the information device includes
a function executing unit configured to execute the predetermined function on the basis of the control by the control unit of the wearable information device.

According to an embodiment of the present invention, an information processing system includes:
an information device configured to execute a predetermined function; and
a wearable information device configured to communicate with the information device, wherein
the wearable information device includes
an image taking unit configured to take an image of an object in a direction of line of vision of a user, and
an image transmitting unit configured to transmit the image taken by the image taking unit to the information device, and
the information device includes
a function executing unit configured to execute the predetermined function,
a memory unit configured to store device identifying information used for identifying the information device registered in advance,
a confirmation unit configured to confirm the presence or absence of the information device in the taken image transmitted by the wearable information device, by image analysis based on the device identifying information stored in the memory unit, and
a control unit configured to control execution of the function of the function executing unit on the basis of a result of the confirmation of the information device by the confirmation unit.

According to an embodiment of the present invention, an information device in an information processing system formed of the information device configured to execute a predetermined function, and a wearable information device configured to communicate with the information device, the information device includes:
a function executing unit configured to execute the predetermined function;
a memory unit configured to store device identifying information used for identifying the information device registered in advance;
a confirmation unit configured to confirm the presence or absence of the information device in a taken image, in which an object in a direction of line of vision of a user of the wearable information device is taken, transmitted by the wearable information device, by image analysis based on the device identifying information stored in the memory unit; and
a control unit configured to control execution of the function of the function executing unit on the basis of a result of the confirmation of the information device by the confirmation unit.

According to an embodiment of the present invention, a wearable information device in an information processing system formed of an information device configured to execute a predetermined function, and the wearable information device configured to communicate with the information device, the wearable information device includes:

a memory unit configured to store device identifying information used for identifying the information device registered in advance;

an image taking unit configured to take an image of an object in a direction of line of vision of a user;

a confirmation unit configured to confirm the presence or absence of the information device in the image taken by the image taking unit, by image analysis based on the device identifying information stored in the memory unit; and a notification unit configured to notify the information device of a result of the confirmation of the information device by the confirmation unit.

According to an embodiment of the present invention, a wearable information device in an information processing system formed of an information device configured to execute a predetermined function, and the wearable information device configured to communicate with the information device, the wearable information device includes:

a memory unit configured to store device identifying information used for identifying the information device registered in advance;

an image taking unit configured to take an image of an object in a direction of line of vision of a user;

a confirmation unit configured to confirm the presence or absence of the information device in the image taken by the image taking unit, by image analysis based on the device identifying information stored in the memory unit; and a control unit configured to control execution of the function of the information device on the basis of a result of the confirmation of the information device by the confirmation unit.

BRIEF DESCRIPTION OF THE DRAWINGS

FIG. 6 is a sequence diagram illustrating the operation of a wrist information device and a head-mounted display according to a second embodiment;

FIG. 8 is a sequence diagram illustrating the operation of a smartphone and a head-mounted display according to a third embodiment.

DETAILED DESCRIPTION OF THE PREFERRED EMBODIMENTS (First Embodiment)

Figure 1:
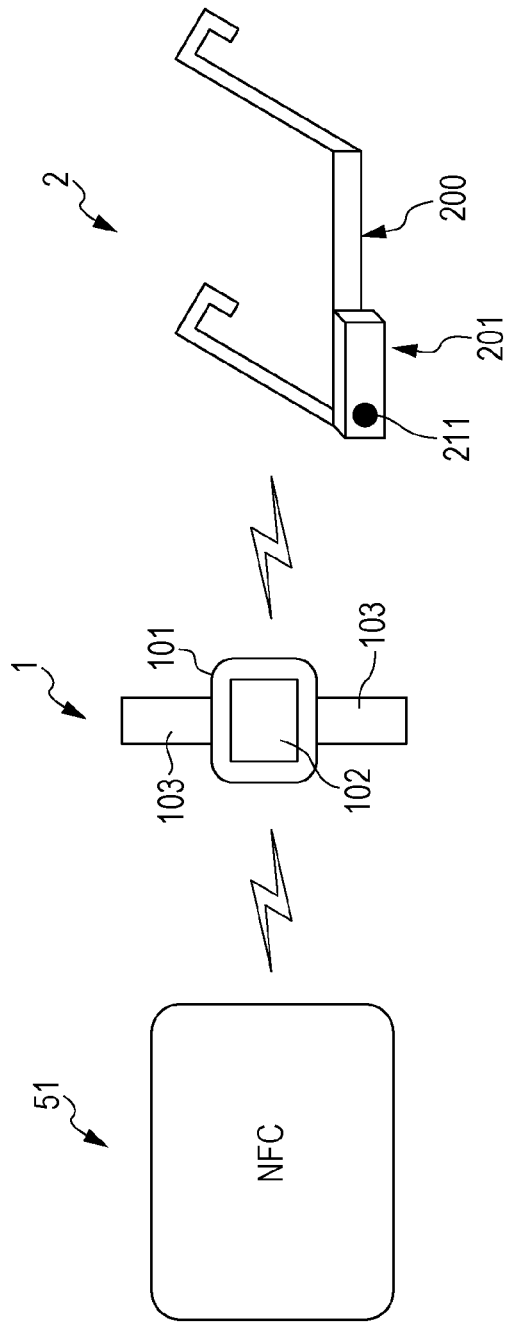
FIG. 1 is a configuration diagram illustrating a skimming prevention system in which an information processing system according to the present invention is employed for preventing skimming.

Hereinafter, an embodiment of the present invention will be described. FIG. 1 is a configuration diagram illustrating a skimming prevention system in which an information processing system according to the present invention is employed for preventing skimming.

The skimming prevention system according to a first embodiment is formed of a wrist information device 1 and a head-mounted display (hereinafter, referred to as HMD) 2 capable of data exchange between each other by near field communication using Bluetooth (registered trademark).

The wrist information device 1 is an information terminal having a shape of a watch so that a user can wear the wrist information device 1 on a wrist, and includes a watch case 101, a display section 102 disposed on the watch case 101 and functioning as a touch panel, and a wrist band 103 attached to each side of the watch case 101.

The wrist information device 1 has an electronic purse function and is capable of electronic payment by performing data communication with a near field communication (NFC) card reader 51 provided in an arbitrary payment terminal by contactless communication using the NFC.

The payment terminal described above is installed in a store such as a convenience store or a commercial facility, or is incorporated in an automatic traffic ticket gate.

The HMD 2 is a wearable information terminal that a user can wear on the head, and a transmissive type that displays a virtual image within a field of view of the user without blocking the field of view.

The HMD 2 is formed of a main body 200 in the shape of glasses, and a display section 201 provided at one side of the main body 200, that is, provided to locate within the vision of the right eye of a user, and configured to display the image within the field of view of the user. Furthermore, the display section 201 is provided with a camera section 211 for taking an image of an object in the direction of line of vision of the user.

Figure 2:
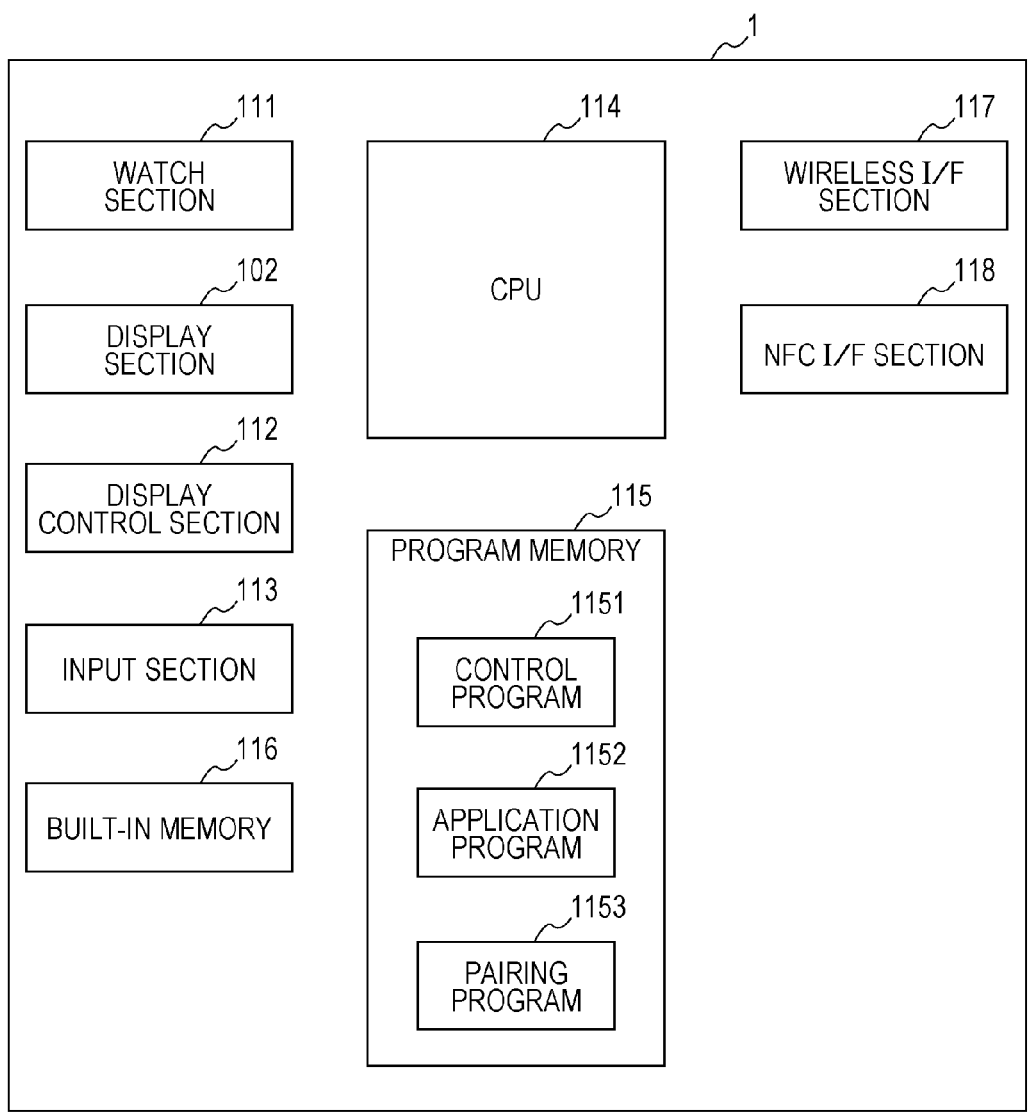
FIG. 2 is a block diagram illustrating a configuration of a wrist information device.

FIG. 2 is a schematic block diagram illustrating a circuit configuration of the wrist information device 1.

A watch section 111 is formed of a watch circuit which counts the current time. The display section 102 is formed of a color liquid crystal display (LCD) and a driving circuit for driving the color LCD. A display control section 112 controls a display state of the display section 102. An input section 113 is formed of various types of switches not shown in FIG. 1. The input section 113 further includes a touch sensor over a surface of the color LCD of the display section 102, and a driving circuit for driving the touch sensor, the touch sensor allowing the display section 102 to function as a touch panel.

A central processing unit (CPU) 114 controls each section of the wrist information device 1. A program memory 115 is a memory in which a control program 1151, an application program 1152, and a pairing program 1153 are stored in advance.

The control program 1151 is a basic control program for allowing the CPU 114 to control the entire functions of the wrist information device 1.

The application program 1152 is formed of plural types of application programs for allowing the CPU 114 to carry out various types of processing including processing to be described later. In addition, the application program 1152 is provided with terminal identifying information to be used when the wrist information device 1 is recognized by a publicly-known image recognition technique in an image of the wrist information device 1 taken by the HMD 2. The examples of the terminal identifying information include feature data indicating the color, shape, and the like of the wrist information device 1.

The pairing program 1153 is a program for performing pairing (setting of connection) for Bluetooth (registered trademark) with the HMD 2, for example.

A built-in memory 116 is flash memory or the like, and stores various types of settings information used for determining the operational contents of the wrist information device 1, and various types of data including data of an ID number unique to the wrist information device 1 for use in the electronic payment, balance data or the like.

A wireless I/F section 117 performs data communication with respect to the HMD 2 or the like via Bluetooth (registered trademark). A NFC I/F section 118 includes a loop antenna and a receiving/transmitting circuit, and performs data communication required for the electronic payment by contactless communication using the NFC with the NFC card reader 51 described above.

Figure 3:
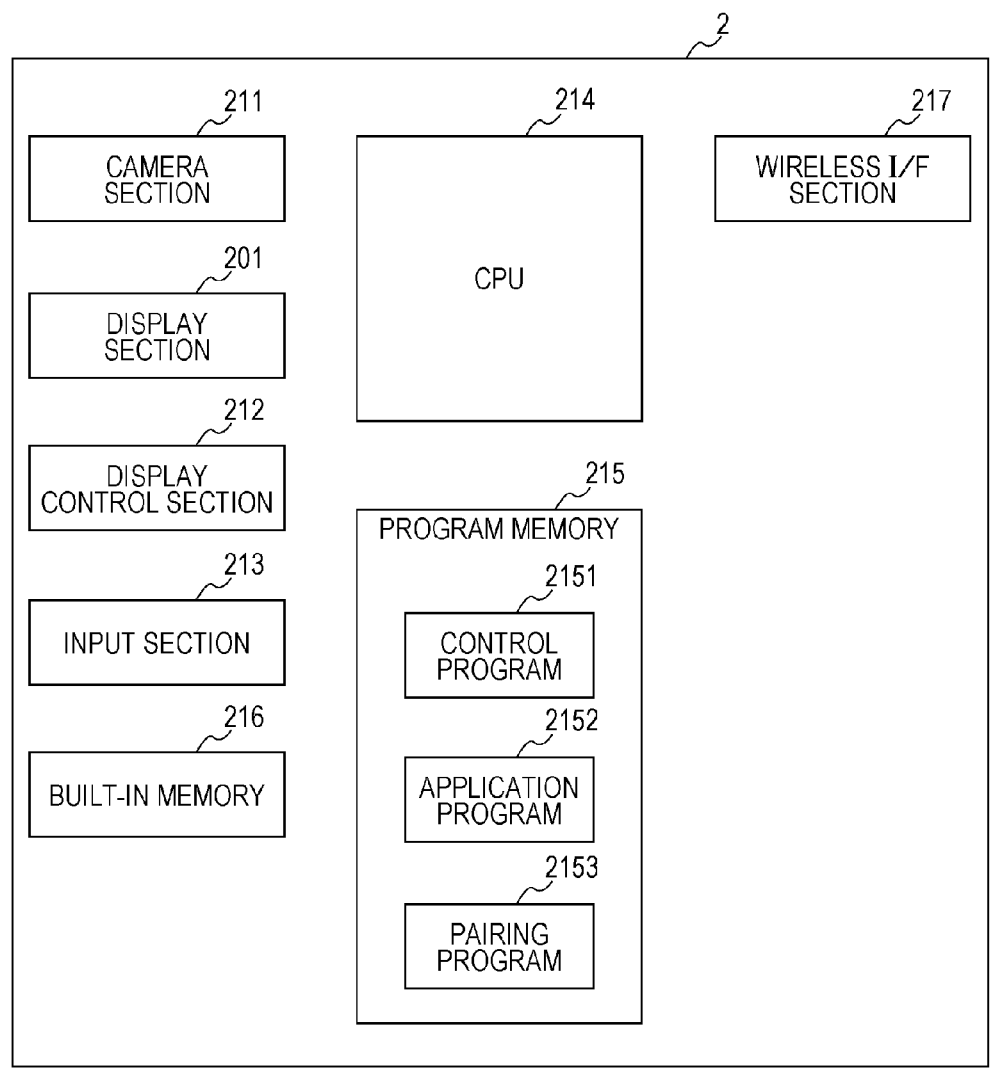
FIG. 3 is a block diagram illustrating a configuration of a head-mounted display.

FIG. 3 is a schematic block diagram illustrating a circuit configuration of the HMD 2.

The display section 201 is formed of a light source such as an LED, a transmissive liquid crystal display element that displays an image based on image data, and a driving circuit for the display element. Although not shown in the drawings, in the display section 201, an optical system is included that has a projector lens for adjusting the size of an image displayed in the liquid crystal display element described above, and a light guide plate containing a half mirror layer. Furthermore, a light emitted from the light source is converted into a projection light by the liquid crystal display element and is projected on the half mirror layer within the light guide plate through the projector lens, so that the display section 201 displays a picture as a virtual image in the vision of a user without blocking the vision of the user in the region of the right eye.

The camera section 211 includes an image taking element such as a complementary metal oxide semiconductor (CMOS) type or a charge coupled device (CCD), and a signal processing circuit that generates taken-image data based on an image taking signal obtained by the image taking element, for example.

A display control section 212 controls the displays of pictures by the display section 201. A input section 213 includes different types of switches not shown in FIG. 1.

A CPU 214 controls the entire functions of the HMD 2. A program memory 215 stores a control program 2151, an application program 2152, and a pairing program 2153 in advance.

The control program 2151 is a basic control program for allowing the CPU 214 to control the entire functions of the HMD 2. The application program 2152 is formed of application programs for allowing the CPU 214 to carry out various types of processing including processing described later. The pairing program 2153 is a program for performing pairing (setting of connection) for Bluetooth (registered trademark) with the wrist information device 1, for example.

A built-in memory 216 is a flash memory, for example, which stores various types of settings information used for determining the operational contents of the HMD 2, taken-image data of an object captured by the camera section 211, and registration information on at least one wrist information device 1 and other different types of information devices previously registered by the pairing.

The information of the registration information, which relates to the at least one wrist information device 1, includes the terminal identifying information used for identifying a registered wrist information device 1 in an image taken of the registered wrist information device 1, the terminal identifying information being stored in the built-in memory 216 so as to correspond to ID data for individual identification of the registered wrist information device 1.

A wireless I/F section 218 executes data communication with the wrist information device 1, for example, via Bluetooth (registered trademark).

Next, the wrist information device 1 and the HMD 2 thus formed will be described in terms of their operations relevant to the present invention.

Figure 4:
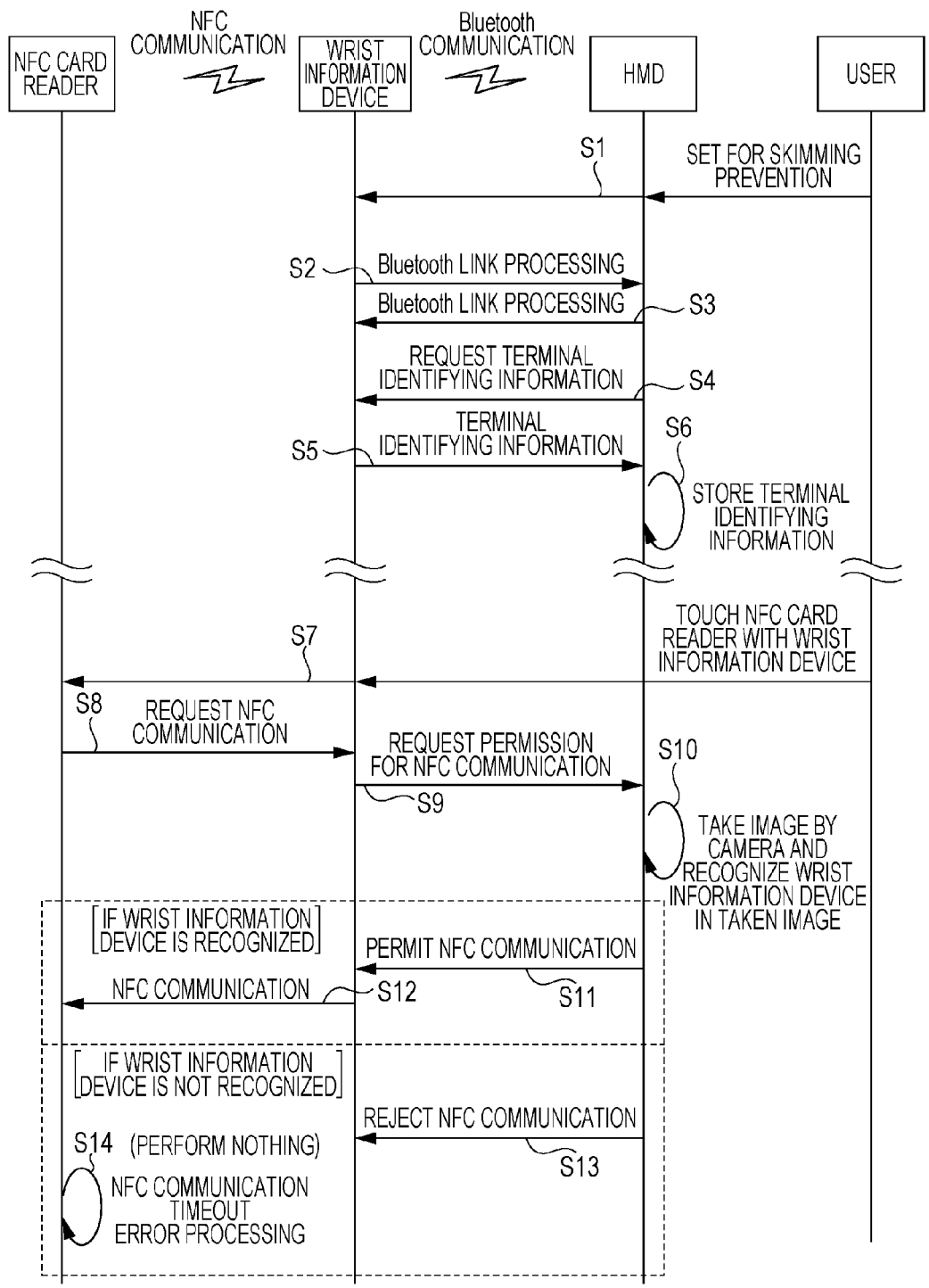
FIG. 4 is a sequence diagram illustrating the operation of a wrist information device and a head-mounted display according to a first embodiment.

FIG. 4 is a sequence diagram illustrating the contents of operations performed by the wrist information device 1 and the HMD 2 when a user uses the skimming prevention system according to the first embodiment. More specifically, FIG. 4 illustrates the contents of operations performed in a manner such that the CPU 114 executes the programs stored in the program memory 115 in the wrist information device 1 and the CPU 214 executes the programs stored in the program memory 215 in the HMD 2.

First, a user performs a predetermined setting operation (S1) on the wrist information device 1 and the HMD 2 in using the skimming prevention system according to the first embodiment.

With the operation S1, Bluetooth linking processing (publicly-known pairing processing) is performed between the wrist information device 1 and the HMD 2 (S2 and S3) so that data communication is enabled between the wrist information device 1 and the HMD 2.

Subsequently, the HMD 2 requests the terminal identifying information for the terminal from the wrist information device 1 (S4). In response to the request, the wrist information device 1 sends the terminal identifying information to the HMD 2 (S5). The HMD 2 receives the terminal identifying information, and then stores the information in the built-in memory 216 so that the information corresponds to the ID data of the wrist information device 1 obtained by the pairing processing (S6). In this way, measures have been taken against skimming.

Figure 5A:
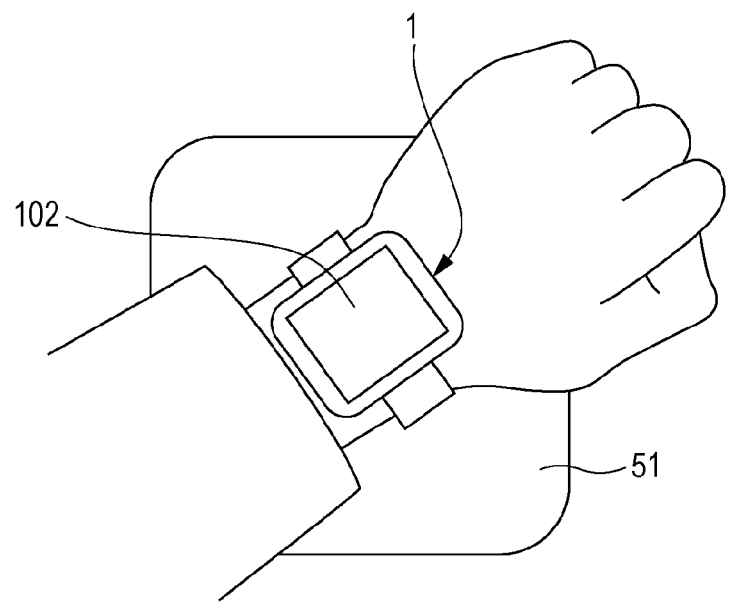
FIG. 5A is an explanation diagram illustrating an example of an embodiment of an electronic payment.

Thereafter, when the user touches the NFC card reader 51 with the wrist information device 1 as shown in FIG. 5A (or passes the wrist information device 1 over the NFC card reader 51) (S7), the NFC card reader 51 issues an NFC communication request to the wrist information device 1 (S8).

The wrist information device 1 receives the "NFC communication request" and issues an NFC communication permission request to the HMD 2 (S9). In other words, the wrist information device 1 sends an inquiry to the HMD 2 about the permission for execution of the NFC communication.

After receiving the inquiry, the HMD 2 recognizes the wrist information device 1 by taking an image of an object in the direction of line of vision of the user with the camera section 211 and performing recognition processing on the image using the terminal identifying information having been acquired from the wrist information device 1 and stored in the HMD 2 in advance (S10). In other words, the HMD 2 determines whether or not the taken image shows the object, which is the wrist information device 1 having issued the "NFC communication permission request."

In the meanwhile, the image-taking for the object may be routinely conducted while the skimming prevention system is being used.

The HMD 2 repeats the above processing within a period of time set in advance. More specifically, if the wrist information device 1 cannot be recognized in the beginning of the processing or after the beginning of the processing, the image-taking is repeatedly conducted at fixed intervals within the predetermined period of time, with the recognition processing sequentially performed on the taken images.

Figure 5B:
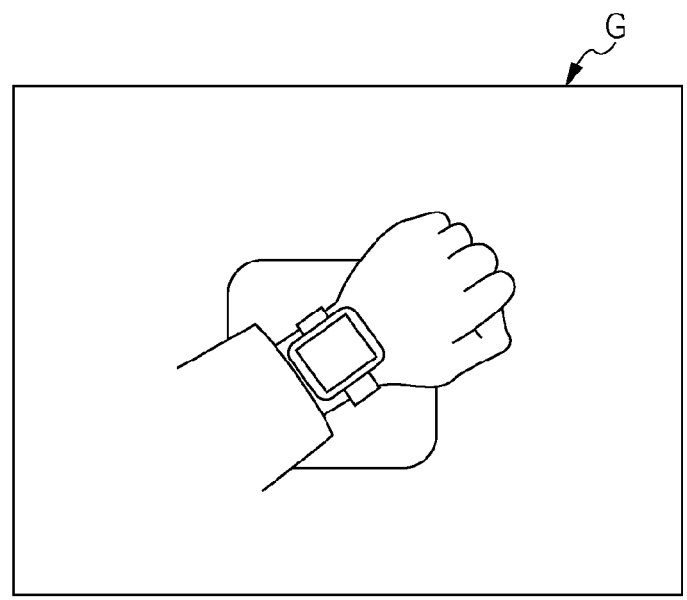
FIG. 5B is an explanation diagram illustrating an example of an image taken by the head-mounted display.

Furthermore, if the HMD 2 can obtain a taken image G as shown in FIG. 5B before the elapse of the predetermined period of time described above and the wrist information device 1 can be recognized in the taken image G, the HMD 2 issues an "NFC communication permission" to the wrist information device 1 (S11). In other words, the wrist information device 1 receives permission for NFC communication from the HMD 2.

If the wrist information device 1 receives the "NFC communication permission," it performs NFC communication responding to a request from the NFC card reader 51, which is transmitting of an unique ID number of the wrist information device 1, balance data, etc. (S12). In this way, various types of electronic payments are made.

On the other hand, if the HMD 2 cannot recognize in the taken images the wrist information device 1 having issued the "NFC communication permission request" within the predetermined period of time described above, the HMD 2 sends an "NFC communication rejection" to the wrist information device 1 (S13). In other words, the HMD 2 determines that there is a possibility of skimming performed and makes a reply to the wrist information device 1 to the effect that the NFC communication must not be made.

If the wrist information device 1 receives the "NFC communication rejection," it makes no reply to a request from the NFC card reader 51 and discontinues the subsequent NFC communication with the NFC card reader 51. Thus, the NFC card reader 51 cannot receive a reply from the wrist information device 1 within the predetermined period of time, and performs timeout error processing for the NFC communication to end the NFC communication.

As described above, in the skimming prevention system according to the first embodiment, if no image has been taken by the HMD 2 of the wrist information device 1 when the "NFC communication permission request" is received from the wrist information device 1 or within the predetermined period of time, the subsequent NFC communication between the wrist information device 1 and the NFC card reader 51 is automatically discontinued.

If the user intends to voluntarily touch the NFC card reader 51 with the wrist information device 1, the user is usually looking at the wrist information device 1. An image of the wrist information device 1 is taken by the HMD 2 when the user is looking at the wrist information device 1 or within the predetermined period of time.

In contrast, if the NFC card reader 51 becomes in contact with the wrist information device 1 before the user knows it, that is, if skimming is attempted on the wrist information device 1, no images has been taken of the wrist information device 1 by the HMD 2 within the predetermined period of time because the user has not been looking at the wrist information device 1. In that case, the wrist information device 1 discontinues the subsequent NFC communication with the NFC card reader 51 so that the skimming can be prevented without fail.

In this way, when a user uses the electronic purse function of the wrist information device 1, the user can make an electronic payment only by turning the user's face toward the wrist information device 1, which can prevent skimming without fail.

Accordingly, it is possible to attain high security performance without deteriorating the convenience in the information device in the shape of the watch (the wrist information device) according to the skimming prevention system of the first embodiment.

In the first embodiment, the terminal identifying information used when the HMD 2 recognizes the registered wrist information device 1 in a taken image is the information prepared in advance in the wrist information device 1. The terminal identifying information may be information obtained as needed by taking an image of the wrist information device 1 at registration thereof and analyzing the taken image.

Furthermore, in the first embodiment, the registered wrist information device 1 itself is recognized in a taken image. In other words, the presence or absence of the wrist information device 1 in a taken image is determined by a so-called object recognition. The methods for recognizing the wrist information device 1 applicable to the present invention are not limited to the above method.

For example, the presence or absence of the wrist information device 1 in a taken image may be determined by equipping the wrist information device 1 with a LED and using a visible light communication. Alternatively, the presence or absence of the wrist information device 1 in a taken image may be determined by allowing the display section 102 of the wrist information device 1 to display a predetermined identification image (two-dimensional bar code, for example) when the NFC card reader 51 transmits a NFC communication request, for example, and recognizing the identification image. The identification image may be an image prepared in advance in the wrist information device 1 or an image that the HMD 2 automatically allocated to the wrist information device 1 at registration thereof and supplied to the wrist information device 1.

Moreover, in addition to the configurations described in the first embodiment, a configuration may be employed in which the HMD 2 constantly displays in the field of view of a user the progress of electronic payments with the NFC technology with the wrist information device 1, for example. With the configuration, the user can be instantly notified of attempted skimming to the wrist information device 1, and this leads to ensuring of higher security performances.

Furthermore, much higher security performances can be ensured by permitting the NFC communication not only when the HMD 2 can recognize the wrist information device 1 in a taken image but also when the HMD 2 can recognize a user's specific gesture determined in advance within the angle of view of the HMD 2 (camera section 211) or when a predetermined switching operation is performed in the HMD 2 in parallel with the recognition of the wrist information device 1 in a taken image.

Furthermore, although the first embodiment employs the HMD 2 as the wearable information terminal of the skimming prevention system, the wearable information terminal in the present invention is not particularly limited as long as the wearable information terminal is configured to be able to take an image of an object in the direction of line of vision of a user when receiving the "NFC communication permission request" from the wrist information device 1. In the implementation of the present invention, not only the HMD 2 but also any other wearable information terminals may be adequately used.

Moreover, although the first embodiment employs the wrist information device 1 as the information device of the skimming prevention system, the information device applicable to the present invention is not particularly limited as long as the information device is configured to be able to read stored data by contactless communication. The present invention is advantageous for preventing skimming to any information devices other than the wrist information device 1, such as a ring-shaped wearable information terminal, and further, not limiting wearable information terminal, a mobile phone and a smartphone with the electronic purse function.

In addition, in the first embodiment, the wrist information device 1 transmits an "NFC communication permission request" to the HMD 2, and the HMD 2 confirms whether or not the wrist information device 1 as a transmission source of the "NFC communication permission request" is recognized as an object in the taken image before a predetermined time elapses in response to the "NFC communication permission request" from the wrist information device 1. Meanwhile, it may be configured such that the HMD 2 notifies the wrist information device 1 of whether or not the taken image shows the wrist information device 1 as the object regardless of the "NFC communication permission request" from the wrist information device 1 and the wrist information device 1 controls the NFC communication in response to the result of the confirmation. In other words, it may be controlled such that the wrist information device 1 turns on the electronic purse function in a case where the HMD 2 notifies that the wrist information device 1 is recognized as the object, and on the contrary, the wrist information device 1 turns off the electronic purse function in a case where the HMD 2 notifies that the wrist information device 1 is not recognized as the object.

In addition, although the data as the target of skimming prevention in the wrist information device 1 in the first embodiment is data for use in an electronic payment, any other types of data may be the target of skimming prevention as long as the data can be found by contactless communication in accordance with a freely selected standard.

The data which can be found by contactless communication includes vital information and action history data, the vital information being obtained when the wrist information device 1 has a function of acquiring and storing vital information indicating the physical states of a user and the action history data being obtained when the wrist information device 1 has a function of acquiring and storing action history data (GPS information, for example) indicating the action history of a user.

(Second Embodiment)

In the first embodiment, the information processing system of the present invention is employed for preventing skimming, and in a second embodiment, a description will be made regarding a case where the information device in the shape of a watch (the wrist information device) is employed as a display control system.

The display control system according to the second embodiment is formed of the wrist information device 1 capable of data exchange by near field communication using Bluetooth (registered trademark), and the head-mounted display HMD 2.

Furthermore, since the wrist information device 1 and the HMD 2 according to the second embodiment have the same circuit configuration as in the first embodiment, the description thereof will be omitted.

The wrist information device 1 is different from a general watch, and the wrist information device 1 itself executes high-level processing such as displaying a map, and displays the result of the processing on the display section 102 provided in the wrist information device 1. Accordingly, the display section 102 is configured with a high-definition color liquid crystal display (LCD) or the like in many cases, and thus, there is a problem that a great deal of power is consumed in the display section 102.

FIG. 6 is a sequence diagram illustrating the contents of operations performed by the wrist information device 1 and the HMD 2 when a user uses the display control system according to the second embodiment. To be more specific, FIG. 6 illustrates the contents of operations performed in a manner such that the CPU 114 executes the programs stored in the program memory 115 in the wrist information device 1, and the CPU 214 executes the programs stored in the program memory 215 in the HMD 2.

First, a user performs a predetermined setting operation (S21) on both the wrist information device 1 and the HMD 2 when using the display control system according to the second embodiment.

Then, Bluetooth linking processing (publicly-known pairing processing) is performed between the wrist information device 1 and the HMD 2 (S22 and S23) so that data communication is enabled therebetween.

Subsequently, the HMD 2 requests the terminal identifying information for the terminal with respect to the wrist information device 1 (S24). In response to the request, the wrist information device 1 transmits the terminal identifying information to the HMD 2 (S25). The HMD 2 receives the terminal identifying information, and then stores the information in the built-in memory 216 so that the information corresponds to the ID data of the wrist information device 1 obtained by the pairing processing (S26). In this way, measures have been taken for the display control.

After taking the measure for the display control, the wrist information device 1 turns off the display of the display section 102 after a predetermined time elapses (S27).

Meanwhile, the HMD 2 regularly takes an image of an object in the direction of line of vision of the user with the camera section 211, and further performs recognition processing on the image using the stored terminal identifying information acquired from the wrist information device 1 in advance, thereby recognizing the wrist information device 1 in the taken image (S28). In other words, the HMD 2 regularly confirms whether or not the taken image shows the wrist information device 1 as the object.

The HMD 2 repeats the above processing within a period of time set in advance. In other words, although the wrist information device 1 cannot be recognized in the beginning of the processing or after the beginning of the processing, the image-taking is repeatedly conducted at fixed intervals within the predetermined period of time, with the recognition processing sequentially performed on the taken images.

Thereafter, when the user passes the wrist information device 1 over the front of the user's face in the above state, the HMD 2 can obtain the taken image of the wrist information device 1 before the elapse of the predetermined period of time, and when the wrist information device 1 is recognized in the taken image, the HMD 2 transmits "display-ON of the display section" to the wrist information device 1 (S29). In other words, the wrist information device 1 receives permission for turning-on of display of the display section 102 from the HMD 2.

If the wrist information device 1 receives the "display-ON of the display section", the wrist information device 1 turns on the display of the display section 102 (S30). In this way, the user can confirm the content being displayed on the display section 102 of the wrist information device 1.

On the other hand, if the HMD 2 cannot recognize the wrist information device 1 in the taken image within the predetermined period of time, the HMD 2 transmits "display-OFF of the display section" to the wrist information device 1 (S31). In other words, the HMD 2 determines that the user does not look at the wrist information device 1, and makes a reply to the wrist information device 1 regarding the indication to turn off the display of the display section 102.

If the wrist information device 1 receives the "display-OFF of the display section", the wrist information device 1 turns off the display of the display section 102 (S32).

As described above, in the display control system according to the second embodiment, the display of the display section 102 is turned on only when the user passes the wrist information device 1 over the front of the user's face, and the display of the display section 102 of the wrist information device 1 is turned off when the user does not look at the wrist information device 1.

Accordingly, it is possible to greatly reduce power consumption without deteriorating the convenience in the wrist information device 1 according to the display control system according to the second embodiment.

(Third Embodiment)

In the second embodiment, the information processing system according to the present invention is employed for controlling the display of the information device in the shape of a watch (the wrist information device), and in a third embodiment, a description will be made regarding a case where the information processing system is employed as a security lock control system of a smartphone.

The security lock control system according to the third embodiment is formed of a smartphone 3 capable of data exchange by near field communication using Bluetooth (registered trademark), and the head-mounted display HMD 2.

Figure 7:
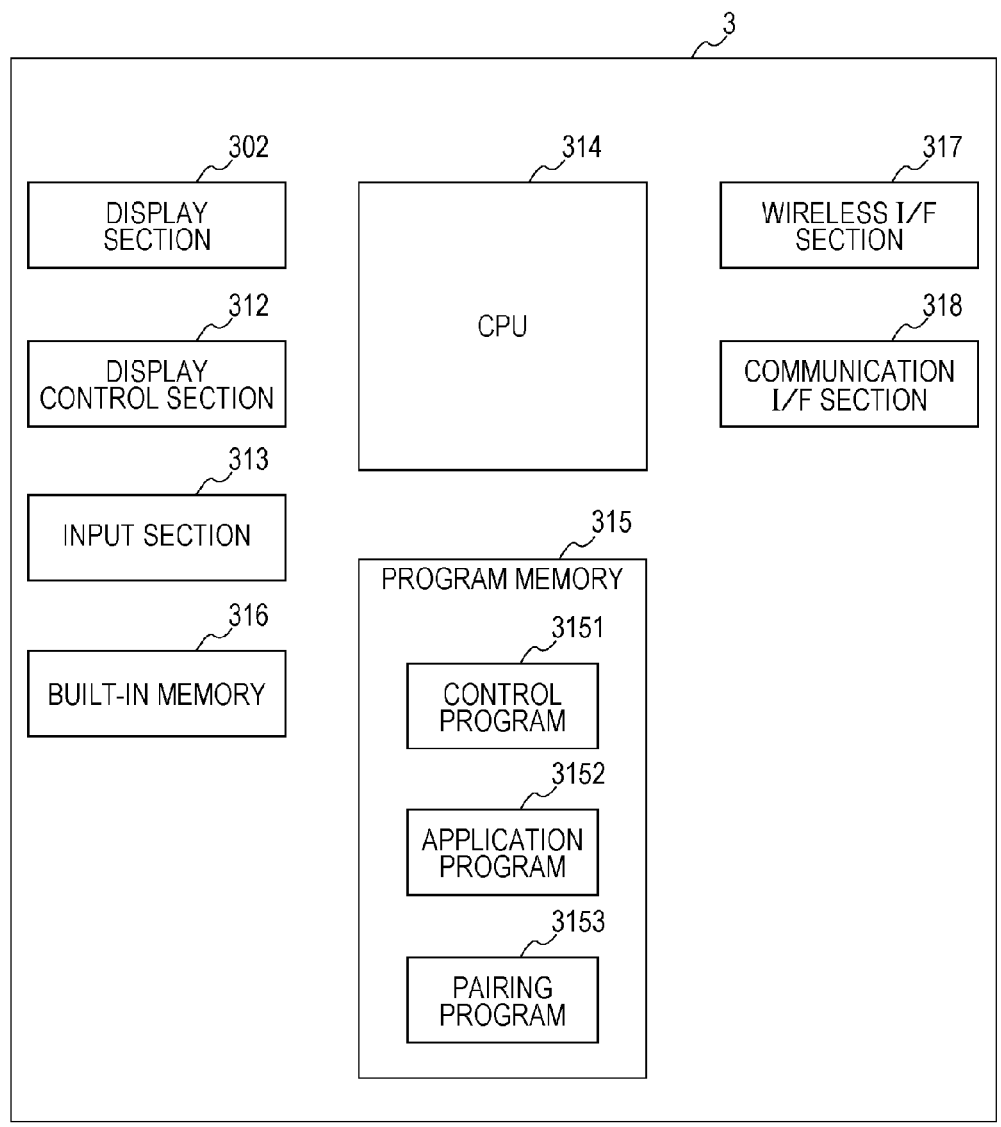
FIG. 7 is a block diagram illustrating a configuration of a smartphone.

FIG. 7 is a schematic block diagram illustrating a circuit configuration of the smartphone 3. Reference numeral 302 denotes a display section which is formed of the color LCD, and a driving circuit for driving the color LCD. Reference numeral 312 denotes a display control section which controls a display state of the display section 302. Reference numeral 313 denotes an input section which is formed of a power source switch and other various types of switches. In addition, the input section 313 further includes a touch sensor covering a surface of the color LCD of the display section 302 and allowing the display section 302 to function as a touch panel, and a driving circuit for driving the touch sensor.

Reference numeral 314 denotes a CPU which controls the entire functions of the smartphone 3. Reference numeral 315 denotes a program memory, in which a control program 3151, an application program 3152, and a pairing program 3153 are stored in advance.

The control program 3151 is a basic control program for allowing the CPU 314 to control the entire functions of the smartphone 3. The application program 3152 is formed of plural types of application programs for allowing the CPU 314 to carry out various types of processing including processing to be described later. The pairing program 3153 is a program for performing pairing (setting of connection) with the HMD 2.

Reference numeral 316 denotes a built-in memory such as flash memory, which stores various types of settings information used for determining the operational contents of the smartphone 3.

Reference numeral 317 denotes a wireless I/F section, which executes receiving and transmitting with respect to the HMD 2 via Bluetooth (registered trademark). Reference number 318 denotes a communication I/F section for connecting the smartphone 3 to the Internet using a public network such as a wireless local area network (LAN).

Incidentally, the smartphone 3 includes well-known circuits for performing sound communication and data communication, that is, a sound input circuit that modulates and transmits an input sound, a transmitting circuit, a receiving circuit that receives, decodes and regenerates a received sound signal, a regenerating circuit, a data transmitting/receiving circuit, and the like. The illustration and descriptions of those circuits will be omitted.

Furthermore, since the circuit configuration of the HMD 2 according to the third embodiment is the same as in the first embodiment, the description thereof will be omitted.

The smartphone 3 stores various types of important data such as personal information in the smartphone, and is generally set with security lock so as not to be operated by a person other than a user of the smartphone 3.

The security lock is released by input of several digits of numbers set by the user of the smartphone 3, or tracing a predetermined track on the touch panel of the smartphone 3 when releasing the security lock. Accordingly, although the security is obtained, there is a problem of reducing the convenience since the user needs to perform the above-described operation every time when the user uses the smartphone 3.

FIG. 8 is a sequence diagram illustrating the contents of operations performed by the smartphone 3 and the HMD 2 when the user uses the security lock control system according to the third embodiment. To be more specific, FIG. 8 illustrates the contents of operations performed in a manner such that the CPU 314 executes the programs stored in the program memory 315 in the smartphone 3 and the CPU 214 executes the programs stored in the program memory 215 in the HMD 2.

First, a user performs a predetermined setting operation (S41) on both the smartphone 3 and the HMD 2 when using the security lock function according to the third embodiment.

Then, Bluetooth linking processing (publicly-known pairing processing) is performed between the smartphone 3 and the HMD 2 (S42 and S43) so that data communication is enabled therebetween.

Subsequently, the HMD 2 requests the terminal identifying information for the terminal with respect to the smartphone 3 (S44). In response to the request, the smartphone 3 transmits the terminal identifying information to the HMD 2 (S45). The HMD 2 receives the terminal identifying information, and then stores the information in the built-in memory 216 so that the information corresponds to the ID data of the smartphone 3 obtained by the pairing processing (S46). In this way, measures have been taken for control of the security lock.

After the measures for control of the security lock is taken, the smartphone 3 sets the security lock to its own terminal after a predetermined time elapses (S47).

Meanwhile, the HMD 2 regularly takes an image of an object in the direction of line of vision of a user with the camera section 211, and further performs recognition processing on the image using the stored terminal identifying information acquired from the smartphone 3 in advance, thereby recognizing the smartphone 3 in the taken image (S48). In other words, the HMD 2 regularly confirms whether or not the taken image shows the smartphone 3 as the object.

The HMD 2 repeats the above processing within a period of time set in advance. In other words, although the smartphone 3 cannot be recognized in the beginning of the processing or after the beginning of the processing, the image-taking is repeatedly conducted at fixed intervals within the predetermined period of time, with the recognition processing sequentially performed on the taken images.

Thereafter, when the user passes the smartphone 3 over the front of the user's face in the above state, the HMD 2 can obtain the taken image of the smartphone 3 before the elapse of the predetermined period of time and when the smartphone 3 is recognized in the taken image, the HMD 2 transmits "unlocking of the security" to the smartphone 3 (S49). In other words, the smartphone 3 receives permission for release of the security lock from the HMD 2.

When receiving the "unlocking of the security", the smartphone 3 releases its security lock (S50). In this way, the user may operate the smartphone 3 immediately.

On the other hand, if the HMD 2 cannot recognize the smartphone 3 in the taken image within the predetermined period of time, the HMD 2 transmits "locking of the security" to the smartphone 3 (S51). In other words, the HMD 2 determines that the user does not look at the smartphone 3, and makes a reply to the smartphone 3 regarding the indication to set the security lock.

When receiving the "locking of the security", the smartphone 3 sets the security lock with respect to its own terminal (S52).

As described above, the security lock is released only when the user passes the smartphone 3 over the front of the user's face in the security lock control system according to the third embodiment, and the security lock is set when the user does not look at the smartphone.

Accordingly, it is possible to obtain the security without deteriorating the convenience in the smartphone 3 according to the security lock control system of the third embodiment.

Furthermore, although the information device in the shape of a watch (the wrist information device) is employed for the skimming prevention, the display control, and the security lock control of the smartphone in the first to third embodiments described above, the device control of the information device is not limited thereto.

While certain embodiments and modified examples have been described, various changes may be made within the range in which the advantages of the present invention can be ensured. The embodiments after the changes fall within the scope of the invention described in the accompanying claims and the equivalent thereof.

The invention claimed is:

1. An information processing system comprising:
an information device; and
a wearable information device,
wherein the wearable information device includes:
  an interface configured to communicate with the information device;
  a memory configured to store device identifying information for identifying the information device;
  a main body configured to be worn on a face of a user associated with the information device;
  an image sensor provided on the main body worn on the face of the user associated with the information device, wherein the image sensor is configured to take an image in a direction of a line of vision of the user wearing the main body; and
  a wearable information device-side processor configured to:
    perform a recognition processing on the image taken by the image sensor using the device identifying information stored in the memory, to confirm whether the line of vision of the user is fixed on the information device; and
    control the interface to notify the information device of a result of a confirmation of whether the line of vision of the user is fixed on the information device, and
wherein the information device includes:
  an information device-side processor configured to switch whether to execute a predetermined function based on the result of the confirmation of whether the line of vision of the user is fixed on the information device, notified from the wearable information device.

2. An information processing system comprising:
an information device; and
a wearable information device,
wherein the wearable information device includes:
  an interface configured to communicate with the information device;
  a memory configured to store device identifying information for identifying the information device;
  a main body configured to be worn on a face of a user associated with the information device;
  an image sensor provided on the main body worn on the face of the user associated with the information device, wherein the image sensor is configured to take an image in a direction of a line of vision of the user wearing the main body; and
  a wearable information device-side processor configured to:
    perform a recognition processing on the image taken by the image sensor using the device identifying information stored in the memory, to confirm whether the line of vision of the user is fixed on the information device; and
    switch, through the interface, whether to execute a predetermined function by the information device based on a result of a confirmation of whether the line of vision of the user is fixed on the information device, and
wherein the information device includes:
  an information device-side processor configured to switch whether to execute the predetermined function by controlling of the wearable information device-side processor of the wearable information device.

3. An information processing system comprising:
an information device; and
a wearable information device,
wherein the wearable information device includes:
  a main body configured to be worn on a face of a user associated with the information device;
  an image sensor provided on the main body worn on the face of the user associated with the information device, wherein the image sensor is configured to take an image in a direction of a line of vision of the user wearing the main body; and
  an image transmitting interface configured to transmit the image taken by the image sensor to the information device, and
wherein the information device includes:
  a memory configured to store device identifying information for identifying the information device; and
  a processor configured to:
    perform a recognition processing on the image taken by the image sensor using the device identifying information stored in the memory, to confirm whether the line of vision of the user is fixed on the information device; and switch whether to execute a predetermined function based on a result of a confirmation of whether the line of vision of the user is fixed on the information device.

4. An information device of an information processing system formed of:
the information device; and
a wearable information device comprising:
an interface configured to communicate with the information device;
a memory configured to store device identifying information for identifying the information device;
a main body configured to be worn on a face of a user associated with the information device;
an image sensor provided on the main body worn on the face of the user associated with the information device, wherein the image sensor is configured to take an image in a direction of a line of vision of the user wearing the main body; and
a wearable information device-side processor configured to:
perform a recognition processing on the image taken by the image sensor using the device identifying information stored in the memory, to confirm whether the line of vision of the user is fixed on the information device; and
control the interface to notify the information device of a result of a confirmation of whether the line of vision of the user is fixed on the information device,
wherein the information device comprises:
a processor configured to switch whether to execute a predetermined function based on the result of the confirmation of whether the line of vision of the user is fixed on the information device, notified from the wearable information device.

5. The information device according to claim 4,
wherein the processor is configured to transmit, as the predetermined function, data stored in the information device through contactless communication to a predetermined terminal.

6. The information device according to claim 4, further comprising:
a display configured to display predetermined information,
wherein the processor is configured to execute, as the predetermined function, display control of the display.

7. The information device according to claim 4,
wherein the processor is configured to execute, as the predetermined function, a security lock operation which disables operation of the information device.

8. An information device of an information processing system formed of:
the information device; and
a wearable information device, comprising:
a main body configured to be worn on a face of a user associated with the information device;
an image sensor provided on the main body worn on the face of the user associated with the information device, wherein the image sensor is configured to take an image in a direction of a line of vision of the user wearing the main body; and
an image transmitting interface configured to transmit the image taken by the image sensor to the information device,
wherein the information device comprises:
a memory configured to store device identifying information for identifying the information device; and
a processor configured to:
perform a recognition processing on the image taken by the image sensor transmitted from the wearable information device using the device identifying information stored in the memory, to confirm whether the line of vision of the user is fixed on the information device; and
switch whether to execute a predetermined function based on a result of a confirmation of whether the line of vision of the user is fixed on the information device.

9. A wearable information device of an information processing system formed of:
an information device; and
the wearable information device,
the wearable information device comprising:
an interface configured to communicate with the information device;
a memory configured to store device identifying information for identifying the information device;
a main body configured to be worn on a face of a user associated with the information device;
an image sensor provided on the main body worn on the face of the user associated with the information device, wherein the image sensor is configured to take an image in a direction of a line of vision of the user wearing the main body; and
a processor configured to:
perform a recognition processing on the image taken by the image sensor using the device identifying information stored in the memory, to confirm whether the line of vision of the user is fixed on the information device; and
switch, through the interface, whether to execute a predetermined function by the information device based on a result of a confirmation of whether the line of vision of the user is fixed on the information device.

10. A method of controlling an information device of an information processing system formed of:
the information device; and
a wearable information device comprising:
a main body configured to be worn on a face of a user associated with the information device;
an image sensor provided on the main body worn on the face of the user associated with the information device, wherein the image sensor is configured to take an image in a direction of a line of vision of the user wearing the main body; and
an interface configured to communicate the image taken by the image sensor to the information device,
the method comprising:
controlling a memory to store device identifying information for identifying the information device;
performing a recognition processing on the image taken by the image sensor using the device identifying information for identifying the information device, to confirm whether the line of vision of the user is fixed on the information device; and
switching whether to execute a predetermined function based on a result of a confirmation of whether the line of vision of the user is fixed on the information device.

11. A method of controlling an information device of an information processing system formed of:

information device; and
a wearable information device comprising:
an interface configured to communicate with the information device;
a memory configured to store device identifying information for identifying the information device;
a main body configured to be worn on a face of a user associated with the information device;
an image sensor provided on the main body worn on the face of the user associated with the information device, wherein the image sensor is configured to take an image in a direction of a line of vision of the user wearing the main body; and
a wearable information device-side processor configured to:
perform a recognition processing on the image taken by the image sensor using the device identifying information stored in the memory, to confirm whether the line of vision of the user is fixed on the information device; and
control the interface to notify the information device of a result of a confirmation of whether the line of vision of the user is fixed on the information device, the method comprising:
switching whether to execute a predetermined function based on the result of the confirmation of whether the line of vision of the user is fixed on the information device, notified from the wearable information device.

12. A method of controlling a wearable information device of an information processing system formed of:
an information device configured to execute a predetermined function; and
the wearable information device, the wearable information device comprising:
a memory;
a main body configured to be worn on a face of a user associated with the information device;
an image sensor provided on the main body worn on the face of the user associated with the information device; and
an interface configured to communicate with the information device, the method comprising:
controlling the memory to store device identifying information for identifying the information device;
controlling the image sensor to take an image in a direction of a line of vision of the user wearing the main body;
performing a recognition processing on the image taken by the image sensor using the device identifying information stored in the memory, to confirm whether the line of vision of the user is fixed on the information device; and
switching, through the interface, whether to execute the predetermined function by the information device based on a result of a confirmation of whether the line of vision of the user is fixed on the information device.

13. A non-transitory computer readable medium storing a program for causing a computer, provided in an information device in an information processing system formed of:
the information device; and
a wearable information device comprising:
a memory;
a main body configured to be worn on a face of a user associated with the information device;
an image sensor provided on the main body worn on the face of the user associated with the information device, wherein the image sensor is configured to take an image in a direction of a line of vision of the user wearing the main body; and
an interface configured to communicate with the information device, to execute:
control the memory to store device identifying information for identifying the information device;
perform a recognition processing on the image taken by the image sensor using the device identifying information stored in the memory, to confirm whether the line of vision of the user is fixed on the information device; and
switch whether to execute a predetermined function based on a result of a confirmation of whether the line of vision of the user is fixed on the information device.

14. A non-transitory computer readable medium storing a program for causing a computer, provided in an information device in an information processing system formed of:
the information device; and
a wearable information device comprising:
an interface configured to communicate with the information device;
a memory configured to store device identifying information for identifying the information device;
a main body configured to be worn on a face of a user associated with the information device;
an image sensor provided on the main body worn on the face of the user associated with the information device, wherein the image sensor is configured to take an image in a direction of a line of vision of the user wearing the main body; and
a wearable information device-side processor configured to:
perform a recognition processing on the image taken by the image sensor using the device identifying information stored in the memory, to confirm whether the line of vision of the user is fixed on the information device; and
control the interface to notify the information device of a result of a confirmation of whether the line of vision of the user is fixed on the information device, to execute:
switch whether to execute a predetermined function based on the result of the confirmation of whether the line of vision of the user is fixed on the information device, notified from the wearable information device.

15. A non-transitory computer readable medium storing a program for causing a computer, provided in a wearable information device in an information processing system formed of:
an information device configured to execute a predetermined function; and
the wearable information device, the wearable information device comprising:
a memory;
a main body configured to be worn on a face of a user associated with the information device;
an image sensor provided on the main body worn on the face of the user associated with the information device; and
an interface configured to communicate with the information device, to execute:
control the memory to store device identifying information for identifying the information device;
control the image sensor to take an image in a direction of a line of vision of the user wearing the main body;
perform a recognition processing on the image taken by the image sensor using the device identifying information stored in the memory, to confirm whether the line of vision of the user is fixed on the information device; and switch, through the interface, whether to execute the predetermined function by the information device based on a result of a confirmation of whether the line of vision of the user is fixed on the information device.

16. The information device according to claim 8, whether the memory is configured to store the device identifying information based on an image of the information device taken by the image sensor of the wearable information device.

17. The wearable information device according to claim 9, wherein the memory is configured to store the device identifying information based on an image of the information device taken by the image sensor of the wearable information device.

18. The information processing system according to claim 1, wherein the memory is configured to store the device identifying information for identifying the information device which is paired with the wearable information device.

19. The information processing system according to claim 2, wherein the memory is configured to store the device identifying information for identifying the information device which is paired with the wearable information device.

20. The information processing system according to claim 3, wherein the memory is configured to store the device identifying information for identifying the information device which is paired with the wearable information device.

\* \* \* \* \*